United States Patent Office 2,815,267
Patented Dec. 3, 1957

2,815,267

PROCESS FOR THE RECOVERY OF TIN OR TIN DIOXIDE FROM MATERIALS CONTAINING TIN IN AN OXIDIC FORM

Joost Cornelis Platteeuw, Amsterdam, and Gerrit Meyer and George Arnold Maria Diepen, Wassenaar, Netherlands, assignors to N. V. Billiton Maatschappij, The Hague, Netherlands, a corporation of the Netherlands No Drawing. Application September 18, 1953,
Serial No. 381,112

Claims priority, application Netherlands
September 20, 1952

10 Claims. (Cl. 23—144)

The customary method for the recovery of tin from ores consists in reducing the tin dioxide to metallic tin. As reducing agents there are generally used in practice, substances containing solid carbon, but proposals have also been made to use gaseous reducing agents.

This method for the recovery of tin has certain disadvantages which are well known. For example, the temperature is sufficiently high also to reduce the oxides of other metals which in almost all cases are present in smaller or larger quantity. The metals so formed can form alloys with tin, which are undesirable and in many cases can only be processed with difficulty. Examples of such alloys are iron-tin alloys, known in this industry as "hard head." Tin oxide is amphoteric and consequently attacks both basic and acid linings of furnaces. Basic linings cause losses of tin in the form of stannates; silicic acid yields tin silicates and both pass into the slag. The tin content of the slags, both combined bound and in the form of metallic tin, is in general so large that they have to be treated separately in order to recover their tin content.

It has been known for a long time that, when carbon is used, the reduction proper is brought about by the gaseous carbon monoxide formed from the carbon. As the oxidation of carbon takes place at an appreciable rate only above 1000° C., tin smelting furnaces (reduction furnaces) working with solid carbon are operated at 1300–1400° C. However, the reduction with gaseous substances itself occurs at appreciably lower temperatures. Thus, in the discussion following the reading of a paper about tin smelting in the U. S. A., temperatures of about 900° C. were mentioned in experiments on carrying out this reduction with carbon monoxide and in which, consequently, liquid tin is also recovered in the furnace (see Trans. A. Inst. Min. Met. Eng. 70 (1924), 442–446). Fink and Mantell (Eng. Mining J. 124 (1927), 967–72; 1052–4) investigated the reduction of tin dioxide with hydrogen at temperatures between 250° C. and 850° C., although they were not the first workers to do so. By extra-polation of the time-temperature curve they found that this reduction occurs instantaneously at 1000° C. In this process also the iron oxides, for example, are reduced to iron. This method, i. e. reduction with the aid of a gaseous reducing agent whereby liquid tin is recovered, does not appear to have been used in practice, at least not on a fairly large scale.

The tin losses occurring in the usual tin smelting process has been noted. As neither tin dioxide nor liquid tin is volatile to any appreciable extent at the temperatures used, these losses must be interpreted in another way, viz. as being due to the occurrence of gaseous SnO at high temperatures, which was later found to be the case.

Various investigations have been made on this volatility. Thus, the article by Veselovskú in J. Appl. Chem. U. S. S. R. 16 (1943), 397–416, contains thermodynamic data concerning equilibria of tin dioxide and tin monoxide with carbon monoxide. As a result of these investigations the author arrives at a reduction process the first phase of which, the reduction of cassiterite, is performed at a relatively low temperature at which the SnO does not exert any appreciable pressure, and the second phase of which necessitates a rapid rise in temperature for smelting the slag formers. Consequently, in this reduction process also the formation of gaseous SnO is regarded as a disadvantage and it is attempted to avoid the volatilization of this compound.

The volatility of solid SnO has been the subject matter of another proposal for a new process. However, in that proposal it is attempted to take advantage of the volatility. The process consists of three phases:

(a) In a volatilization furnace which is heated at about 1000° C., the tin-containing material is smelted with solid carbon and slag formers, the oxygen pressure of the slag being maintained between about $1.3 \times 10^{-15}$ and $7.95 \times 10^{-15}$, so that metallic tin is oxidised to solid SnO and stannic oxide is reduced to solid SnO, the solid SnO, after evaporation, bubbling through the molten slag and being instantaneously oxidised to $SnO_2$ by the atmosphere in the furnace above the slag. Oxygen pressures between the limits mentioned above, correspond to those of mixtures of CO and $CO_2$ containing 33.4–16.8% of CO, of course, at the same temperature;

(b) In a reducing furnace about half of the slag from the first furnace, together with an excess of carbon, is processed to metallic tin and "hard head," the latter products being further worked up in the volatilization furnace;

(c) The $SnO_2$ obtained from the first furnace is briquetted in the usual manner together with a reducing agent and worked up to metallic tin.

Consequently, this process is complicated.

In accordance with the above specification, the first phase may also be carried out in a gaseous medium, for example, with the aid of a mixture of CO and $CO_2$, the oxygen pressure of this mixture again being within the limits mentioned above. As already stated, these pressures (at 927° C.) should be between $1.3 \times 10^{-15}$ (the dissociation pressure of SnO into liquid tin and oxygen) and $7.95 \times 10^{-15}$ (the dissociation pressure of $SnO^2$ into solid SnO and oxygen). Mixtures of CO and $CO^2$ corresponding therewith contain a maximum of 33.4% of CO.

If, continuing these calculations, the oxygen pressures of solid SnO at higher temperatures are calculated, and if the mixtures of CO and $CO_2$ which have equal oxygen pressures are determined, gas mixtures are found which should contain at the most 32.2% of CO at 1100° C., 31.5% at 1200° C., and 31.1% at 1600° C.

Finally (chronologically), the article by Spandau in Ang. Chemie 60 (1948), 73, may be mentioned. This author investigated the chemical processes which occur in the oxidation of melts containing metallic tin with the aid of air in the presence of carbon in a converter at 1300–1500° C. He found that in this refining process tin evaporates as SnO at those temperatures.

The present invention is based on the observation that under certain conditions the reduction of materials containing tin in an oxidic form can be controlled in such a way that substantially all the tin evaporates in the form of stannous oxide. This holds good even when slags are treated, but the process is especially applicable to the recovery of tin from oxidic ores and oxidic concentrates.

According to the invention, the tin dioxide of the starting material is converted into gaseous tin monoxide and the latter is evaporated from the charge by reduction of the starting material at a temperature above 1100° C. with a gas having an oxygen pressure corresponding to that of a mixture of CO and $CO_2$ containing more than 35% of CO. The gaseous atmosphere may, of course, contain gases which are inert with respect to tin and tin oxides. Such a gaseous atmosphere may, for example, be composed of CO (technical), a mixture of CO and $CO_2$, (technical) hydrogen, water gas, producer gas and so on. The gaseous SnO is subsequently converted into tin or tin dioxide.

As no solid reducing agent is used in the new process the system is easily controllable. Additions required for the formation of a slag are superfluous and even undesirable. The yield of tin may amount to 90% or more and can be made fairly complete. Consequently, there is no need to form a residue containing appreciable amounts of tin, and in particular no "hard head."

It is of advantage to maintain the charge at a temperature above the minimum mentioned above. Thus, temperatures ranging from 1300° C. to 1600° C., and advantageously from 1400° C. to 1550° C. are recommended.

When the gaseous atmosphere contains a quantity of the reducing component at the lower limit, the reaction proceeds rather slowly. It is therefore usually of advantage to work with a higher content of the reducing component, for example, when a mixture of CO and $CO_2$ is used, with at least 40% or still better with at least 50% of CO in the gaseous atmosphere. The reduction can be carried out very well with gaseous mixtures having an oxygen pressure corresponding to that of mixtures of CO and $CO_2$ containing 50–80% of CO.

Investigations have shown that various reactions occur in the charge simultaneously or in succession, some of them rapidly and others less rapidly or even slowly. Thus, the reaction of liquid tin and stannic oxide to gaseous stannous oxide proceeds very rapidly. This is evident from the fact that the angle of inclination of the time-volatilization curves with respect to the time axis, when using a gas of a definite composition, is at first fairly constant and in the course of the process decreases more or less rapidly, so that the curve may take an asymptotic course before the tin monoxide has been quantitatively expelled from the charge in the form of gaseous SnO.

It has been found that if this bending of the curve occurs earlier the richer the gas in reducing agent. However, at the outlet the volatilization, under otherwise similar conditions, occurs more rapidly in the case of a gaseous mixture rich in reducing agent than with a mixture poorer in reducing agent. Thus, in an important form of the invention the process is started with a gas having a high content of the reducing component, for example, with a gas the oxygen pressure of which corresponds to that of a mixture of CO and $CO_2$ containing 80, 90, 95 or even 100% of CO, and this atmosphere is maintained until the formation of gaseous SnO decreases or is about to decrease appreciable and, if as high a yield as possible is aimed at, the process is then completed by another expedient. For example, the content of the reducing component in the gaseous atmosphere may then be decreased, and this may be repeated one or more times. In this manner the tin can be substantially completely volatilised from the charge in a very short time. Alternatively, stannic oxide or a material containing tin dioxide is added to the charge as soon as the stage mentioned above has been reached or will soon be reached. In this manner the reaction substantially maintains its original speed. In fact, both of the aforesaid expedients may be applied at the same time. Both expedients may, of course, also be used with gaseous atmospheres having higher oxygen pressures, but in this case the advantage is not so pronounced.

The gaseous stannous oxide issuing from the furnace can be worked up into tin or tin dioxide. Both of these treatments can be carried out very simply.

The manufacture of tin from gaseous SnO may be carried out entirely by cooling the vapours. Alternatively, the vapours may be introduced into a reducing atmosphere, containing, for example, more CO or more of another reducing gas than the atmosphere in which the gaseous SnO was formed. Finally, the two methods may be combined. The cooling may be very considerable, but the fact must be taken into account that the speed of the reduction decreases as the temperature decreases.

Oxidation is necessary for converting the stannous oxide vapour into $SnO_2$. The oxidation may be brought about by the addition of oxygen, for example, in the form of air or of a gas, such as $CO_2$, which under the prevailing conditions has an oxidising action on the gaseous SnO. This may be carried out at the temperature at which the gaseous SnO has been formed or at a higher temperature.

The results of the following experiments illustrate the invention. Unless otherwise stated, there was used as starting material in these experiments an intimate mixture of 3.264 parts by weight of $SnO_2$ on 1.086 parts by weight of FeO. The gaseous atmosphere consisted of CO and $CO_2$.

1,350° C.

| Percent CO | Duration | Loss in weight expressed as a percentage of the $SnO_2$ originally present |
|---|---|---|
| 60 | 30'50" | 71.5 |
| 60 | 41'7" | 87.5 |
| 60 | 51'24" | 91.9 |
| 60 | 93' | 97.0 |

1,450° C.

| Percent CO | Duration | Loss in weight expressed as a percentage of the $SnO_2$ originally present |
|---|---|---|
| 50 | 27' | 94.2 |
| 50 | 32' | 100.7 |
| 60 | 10'17" | 52.3 |
| 60 | 15'25" | 81.8 |
| 60 | 17'25" | 87.8 |
| 60 | 19'25" | 92.3 |
| 60 | 23'25" | 95.5 |
| 80* | 10' | 78.5 |
| 80* | 12' | 85.3 |
| 80* | 14' | 86.9 |
| 80* | 17' | 88.7 |
| 90* | 10' | 60.5 |
| 90* | 20' | 73.3 |

1,550° C.

| Percent CO | Duration | Loss in weight expressed as a percentage of the $SnO_2$ originally present |
|---|---|---|
| 50 | 2' | 40.0 |

*In these experiments the charge consisted of 0.844 part by weight of Fe and 3.264 parts by weight of $SnO_2$.

What we claim is:

1. A process for the recovery of a substance from the group consisting of tin and tin dioxide from a charge of raw materials containing tin in an oxidic form comprising reducing tin dioxide in the raw material at a temperature of at least about 1300° C. with a stream of a reducing gas having an oxygen pressure corresponding to that of a mixture of CO and $CO_2$ containing more than 35% of CO so as to form gaseous stannous oxide, expelling said gaseous stannous oxide from the said charge by said stream and converting the gaseous stannous oxide into the substance desired.

2. A process according to claim 1 comprising using a reducing gas having an oxygen pressure corresponding to that of a mixture of CO and $CO_2$ containing 50–80% of CO.

3. A process according to claim 1 wherein the temperature is not more than about 1600° C.

4. A process according to claim 1 wherein the temperature is within the range of about 1400 to 1550° C.

5. A process for the recovery of a substance from the group consisting of tin and tin dioxide from a charge of raw materials containing tin in an oxidic form comprising reducing tin dioxide in the raw material at a temperature of at least about 1300° C. with a stream of a reducing gas having an oxygen pressure corresponding to that of a mixture of CO and $CO_2$ containing over 80% of CO so as to form gaseous stannous oxide, expelling said gaseous stannous oxide from the said charge by said stream, decreasing the content of the reducing component in said stream when the speed of formation of the gaseous stannous oxide decreases and converting the gaseous stannous oxide into the substance desired.

6. A process for the recovery of a substance from the group consisting of tin and tin dioxide from a charge of raw materials containing tin in an oxidic form comprising reducing tin dioxide in the raw material at a temperature of at least about 1300° C. with a stream of a reducing gas having an oxygen pressure corresponding to that of a mixture of CO and $CO_2$ containing over 80% of CO so as to form gaseous stannous oxide, expelling said gaseous stannous oxide from the said charge by said stream, adding materials containing $SnO_2$ when the speed of formation of the gaseous stannous oxide decreases and converting the gaseous stannous oxide into the substance desired.

7. A process for the recovery of tin from a charge of raw materials containing tin in an oxidic form comprising reducing tin dioxide in the raw material at a temperature above 1100° C. with a stream of a reducing gas having an oxygen pressure corresponding to that of a mixture of CO and $CO_2$ containing more than 35% of CO so as to form gaseous stannous oxide, expelling said gaseous stannous oxide from the said charge by said stream and converting said gaseous stannous oxide into metallic tin by cooling its vapors.

8. A process for the recovery of tin from a charge of raw materials containing tin in an oxidic form comprising reducing tin dioxide in the raw material at a temperature above 1100° C. with a stream of a reducing gas having an oxygen pressure corresponding to that of a mixture of CO and $CO_2$ containing more than 35% of CO so as to form gaseous stannous oxide, expelling said gaseous stannous oxide from the said charge by said stream and converting said gaseous stannous oxide into metallic tin by introducing it into a reducing gaseous atmosphere having an oxygen pressure which is not higher than that of the reducing atmosphere in which the stannous oxide was formed.

9. A process for the recovery of tin dioxide from a charge of raw materials containing tin in an oxidic form comprising reducing tin dioxide in the raw material at a temperature of at least 1300° C. with a stream of a reducing gas having an oxygen pressure corresponding to that of a mixture of CO and $CO_2$ containing more than 35% of CO so as to form gaseous stannous oxide, expelling said gaseous stannous oxide from the said charge by said stream and converting said gaseous stannous oxide into tin dioxide by oxidizing it at a temperature not lower than that at which it was formed.

10. A process according to claim 9 comprising performing the oxidation of the stannous oxide by the addition of a gas having an oxidizing action on the said stannous oxide under the prevailing conditions.

References Cited in the file of this patent

UNITED STATES PATENTS

| | | |
|---|---|---|
| 1,237,840 | Terwelp | Aug. 21, 1917 |
| 1,973,590 | Weaton | Sept. 11, 1934 |
| 2,474,645 | Baxter | June 28, 1949 |

FOREIGN PATENTS

| | | |
|---|---|---|
| 18,324 | Australia | Oct. 29, 1929 |

OTHER REFERENCES

Transactions American Institute of Mining and Metallurgical Engineers, vol. 70, pages 442–443, R. I. M. M. E., N. Y., 1924.

Spandau: "Thermischen Verhalten von Zinnmonoxyd," "Angewandte Chemie," 60–61, Jg. Ausgabe A, vol. 60, 1948, pages 73–74.